(12) United States Patent
Holley

(10) Patent No.: US 7,570,470 B2
(45) Date of Patent: Aug. 4, 2009

(54) SELF-POWERED COMMUNICATIONS LINK FOR SMART CIRCUIT BREAKERS

(75) Inventor: Robert D. Holley, North Shoreline, WA (US)

(73) Assignee: The Boeing Company, Chicago, IL (US)

( * ) Notice: Subject to any disclaimer, the term of this patent is extended or adjusted under 35 U.S.C. 154(b) by 177 days.

(21) Appl. No.: 11/317,149

(22) Filed: Dec. 23, 2005

(65) Prior Publication Data
US 2006/0109599 A1 May 25, 2006

Related U.S. Application Data

(63) Continuation-in-part of application No. 10/973,760, filed on Oct. 26, 2004.

(51) Int. Cl.
*H02H 3/00* (2006.01)
*G01R 21/00* (2006.01)

(52) U.S. Cl. .............................. 361/64; 361/69; 361/81; 702/62

(58) Field of Classification Search ................... 361/69, 361/64, 81; 702/62
See application file for complete search history.

(56) References Cited

U.S. PATENT DOCUMENTS

| | | | | |
|---|---|---|---|---|
| 3,938,129 | A * | 2/1976 | Smither | .................... 340/855.9 |
| 4,556,882 | A | 12/1985 | Brifman et al. | |
| 4,977,513 | A * | 12/1990 | LaPalme | ..................... 700/293 |
| 5,162,664 | A | 11/1992 | Haun et al. | |
| 5,875,087 | A * | 2/1999 | Spencer et al. | ................ 361/87 |
| 6,212,049 | B1 | 4/2001 | Spencer et al. | |
| 6,868,349 | B2 * | 3/2005 | Fletcher et al. | ............... 702/62 |
| 6,989,734 | B2 * | 1/2006 | Thomas | ...................... 375/258 |
| 7,114,030 | B2 * | 9/2006 | Teicher et al. | ............... 711/115 |
| 2002/0181174 | A1 | 12/2002 | Bilac et al. | |

FOREIGN PATENT DOCUMENTS

WO WO9323760 11/1993

OTHER PUBLICATIONS

NN83024536, IBM Technical Disclosure Bulletin, vol. 25, Issue 9, pp. 4536-4537, Feb. 1983, US.*

* cited by examiner

*Primary Examiner*—Fritz M. Fleming
*Assistant Examiner*—Lucy Thomas
(74) *Attorney, Agent, or Firm*—McNees Wallace & Nurick LLC

(57) ABSTRACT

A circuit breaker communication system is provided including a circuit breaker, an electronic module to record and store data associated with the operation of the circuit breaker, and a portable communication unit for downloading the stored data. The portable communication unit includes a power source, a display unit, a processor unit, a communication interface, and a keypad. Also, a cable is provided for interconnecting the portable communication unit to the electronic module. The cable is configured to carry a data signal between the portable communication unit and the electronic module, and to conduct power to the electronic module from the power source. The system may include an optical communication link to transmit to or receive signals from the circuit breaker, a transmitter to transmit data to the optical communication link; and a receiver to receive signals from the optical communication link.

15 Claims, 5 Drawing Sheets

SELF-POWERED COMMUNICATIONS LINK FOR SMART CIRCUIT BREAKERS

CROSS REFERENCE TO RELATED APPLICATIONS

This patent application is a continuation-in-part of U.S. patent application Ser. No. 10/973,760 filed Oct. 26, 2004, entitled "Device and System for Wireless Communications with a Circuit Breaker".

FIELD OF THE INVENTION

The present invention is directed to a device and system for communications with a circuit breaker, and more particularly, to a device and system that provides for the communication of data from a circuit breaker while the circuit breaker is disconnected from its power supply.

BACKGROUND OF THE INVENTION

Aircraft electronics have become steadily more complex and advanced. This has created increasing demands for and reliance on power availability and reliability for aircraft systems such as flight control systems, electro-hydraulic actuators, navigation systems, communication systems, and entertainment systems. Recently advancements have been made in the area of circuit protection. Traditional overload protecting circuit breakers have been augmented with arc fault protection. Such augmented circuit breakers are referred to as "smart circuit breakers" (SCBs), In addition, aircraft power systems features are being developed, such as system wellness and fault location determination, which will be integrated with the augmented circuit breakers. These capabilities are utilized to further augment the real safety and availability benefits of an advanced electrical power system.

Traditional circuit protection devices focus on protecting wiring insulation from damage caused by overheating. Bimetallic analog elements in the circuit breakers respond to resistance heating of the wiring to cause the circuit breaker to trip. However, most existing commercial airplane circuit breakers do not detect and respond to arc faults. Arc faults may be caused by the chaffing and subsequent intermittent arcing that result from wires contacting the metal structure of the airplane, when the wire insulation has been worn away to expose the bare wire core.

These intermittent faults may fall outside the defined region of most circuit breakers time-current overload response curves. SCBs provide arc fault identification and circuit interruption to isolate a fault on an affected circuit. This supplemental protection is integrated into the existing power protection framework via the traditional electromechanical circuit breaker. The diagnostic information from the measured current and voltage can provide valuable electrical fault diagnostics and location information. Utilizing these same electrical measurements, many additional types of diagnostics can be provided. Some examples of the additional diagnostic capabilities that are currently in development are more precise identification and quantification of series and parallel electrical faults, identification of fault characteristics, arc fault location information and effective use of ancillary fault location equipment to minimize the time to repair affected electrical equipment. This enhanced diagnostic capability is expected to increase aircraft operating availability.

It may also be advantageous to log in-flight operating parameters for a given circuit breaker circuit. For example, a monitoring system may be possible whereby a motor load may be tracked. This may include monitoring and recording the inrush and operating current and this information may be reported to the maintenance crew during scheduled maintenance. If the current is rising over time, it could indicate bearing wear or some other type of abnormality. For example, an electronic motor that may control the control surfaces of an aircraft could be monitored. This would allow the maintenance crew to perform preventative maintenance before a failure occurs, which could result in the loss of the aircraft.

A Built-In-Test (BIT) circuit can be incorporated into the circuit breaker to detect and communicate passive failures during maintenance cycles.

Most aircraft panels contain placards that instruct the technician to remove power before opening the panel. Currently, Federal Aviation Administration regulations require that, if a circuit breaker is to be tested or diagnosed while still mounted inside of the panel, the circuit breaker remain powered. One method of detecting passive failures and interrogating the circuit breaker for trip type and other advanced trouble shooting information is disclosed in U.S. patent application Ser. No. 10/973,760 entitled "Device and System for Wireless Communications with a Circuit Breaker", assigned to The Boeing Company of Chicago, Ill. The method provides an optical link for interrogating a circuit breaker while the circuit breaker is installed and operating in a powered panel. However, when the circuit breaker panel is not powered, the above-described features of the SCBs are unable to communicate data.

Thus, there is a need for a device that can provide power to just the electronic portion of the SCB in order to download information from the SCB when the panel is not powered.

SUMMARY OF THE INVENTION

The present invention is directed to a circuit breaker communication system. The system includes a circuit breaker, an electronic module configured to record and store data associated with the operation of the circuit breaker, and a portable communication unit for downloading the stored data from the electronic module. The portable communication unit includes a power source, a display unit, a processor unit, a communication interface, and a keypad. Also, a cable is provided for interconnecting the portable communication unit to the electronic module. The cable is configured to carry a data signal between the portable communication unit and the electronic module, and to conduct power to the electronic module from the power source.

Optionally, the circuit breaker communication system of the present invention may include an optical communication link to transmit or receive signals from the circuit breaker, a transmitter in communication with the electronic module, the transmitter configured to transmit data to the optical communication link, and a receiver in communication with the electronic module, the receiver configured to receive signals from the optical communication link.

In another aspect, the present invention is directed to a portable communication unit for downloading stored data from a circuit breaker. The portable communication unit includes a power source, a display unit, a processor unit, a communication interface, and a keypad. The portable communication unit is configured to connect to an electronic module disposed in the circuit breaker to receive the data therefrom, to display the data associated with the operation of the circuit breaker, and to power the circuit breaker from the power source to enable communication with the electronic module.

In still another aspect of the present invention, a method of communicating with a circuit breaker is provided and includes the steps of configuring an electronic module in the circuit breaker to measure and record parameters associated with the circuit breaker and a circuit connected thereto; connecting the electronic module to a portable communication unit; powering the electronic module with a power source disposed on the portable communication unit; transmitting data associated with the recorded parameters from the electronic module to the portable communication unit; and displaying at least some of the recorded parameters for analysis.

One advantage of the present invention is the ability to communicate with SCBs through the rear of an unpowered electrical distribution panel.

Another advantage of the present invention is the ability to interrogate or program SCBs that are removed from an electrical distribution panel, e.g., in a testing or maintenance facility.

Yet another advantage of the present invention is the ability to test SCBs under simulated fault conditions and to test various software algorithms in a laboratory environment.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
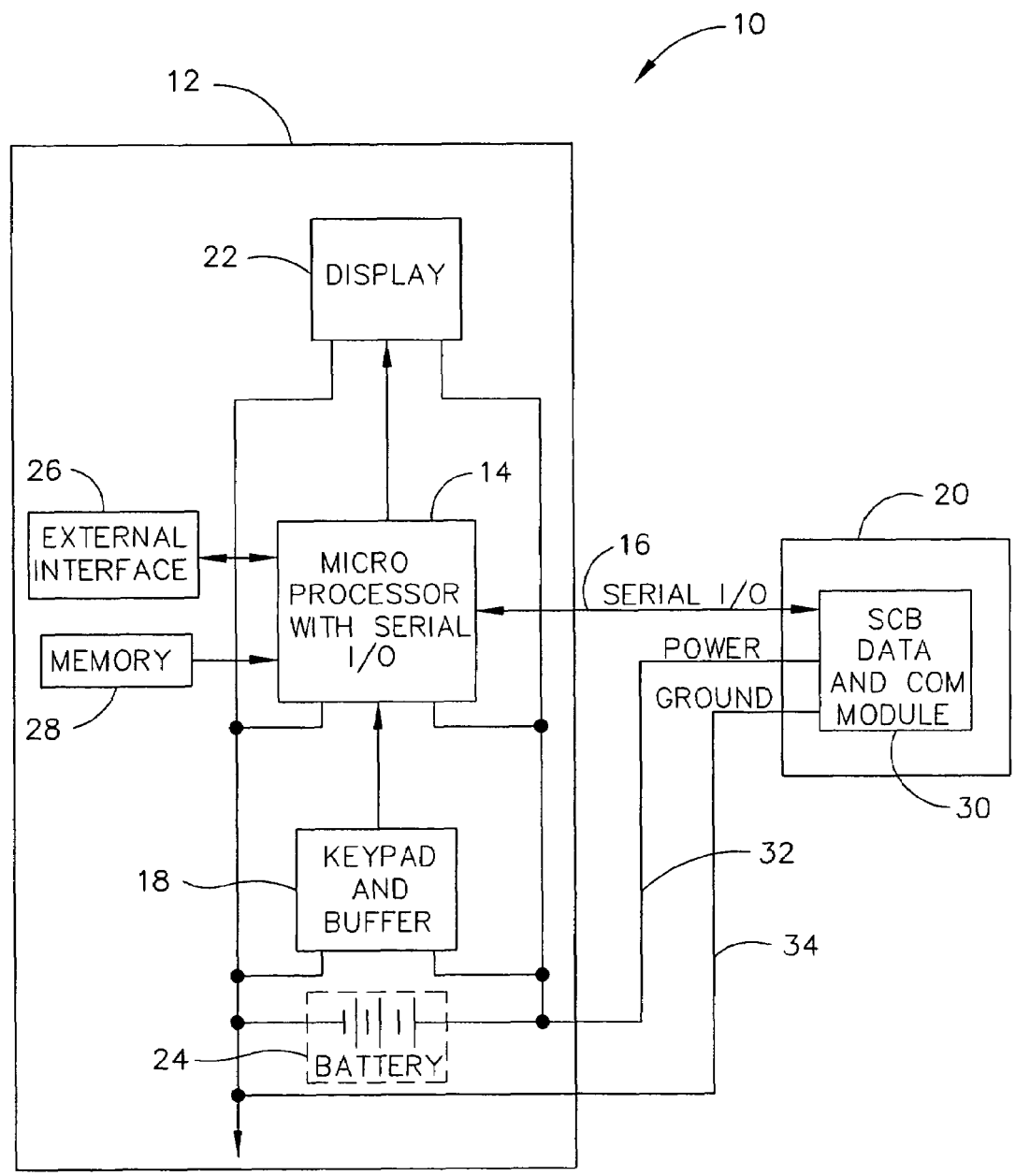
FIG. 1 is a block diagram of the self powered communications link of the present invention.

Referring to FIG. 1, a preferred embodiment for a self-powered communications link system 10 for a smart circuit breaker (SCB) 20 is shown. A portable hand-held unit 12 houses an onboard microprocessor 14, a keypad and buffer [or memory] 18, a display 22 and a power supply 24. The power supply 24 is preferably a DC battery, although other types of power supplies may be used. The microprocessor 14 includes a serial I/O interface for connection to a communication link or serial I/O cable 16. Also, an external interface 26 is provided for communication with a computer, such as a portable computer or a PC (not shown). A memory module 28 may optionally be provided if, for example, the microprocessor 14 does not include onboard memory, or to supplement the microprocessor onboard memory. The serial I/O interface cable 16 is used to connect the serial I/O interface of microprocessor 14 to the SCB 20. The SCB 20 includes a data/communications module 30 with a serial interface port for receiving the I/O interface cable 16. The I/O interface cable 16 carries data signals to the microprocessor 14.

A power conductor 32 and a ground conductor 34 interconnect the SCB data/communications module 30 and the battery 24 located in handheld unit 12, to provide a source of DC power to the SCB data/communications module 30. Preferably, the power and ground conductors 32, 34 are enclosed within the serial I/O cable 16. For example, the cable 16 may be a Universal Serial Bus (USB) cable, which USB cable accommodates power conductor 32 and ground conductor 34. The cable 16 for the serial I/O interface, the power conductor 32 and ground conductor 34, may be a separate component that is readily attachable and detachable from both ends or can be rigidly connected at one or both ends.

In another aspect, the communication signal may be transmitted on the power wire 32 by superimposing the communication signal over the DC power cable 32, thereby eliminate the need for separate signal wire 16.

Alternately, a Universal Asynchronous Receiver/Transmitter (UART) may be used for the serial I/O interface, for the communication link 16 between the microprocessor 14 and the data/communications module 30, when the microprocessor is not provided with a serial port.

The portable handheld unit 12 may be a Personal Digital Assistant (PDA) equipped with specialized software to communicate with the data/communication module 30. Preferably, the PDA includes an enhanced power supply to support the additional load of the SCB 20. Alternatively, the portable handheld unit 12 may be a dedicated appliance specifically designed for the SCB 20 to communicate with the data/communication module 30.

Figure 2:
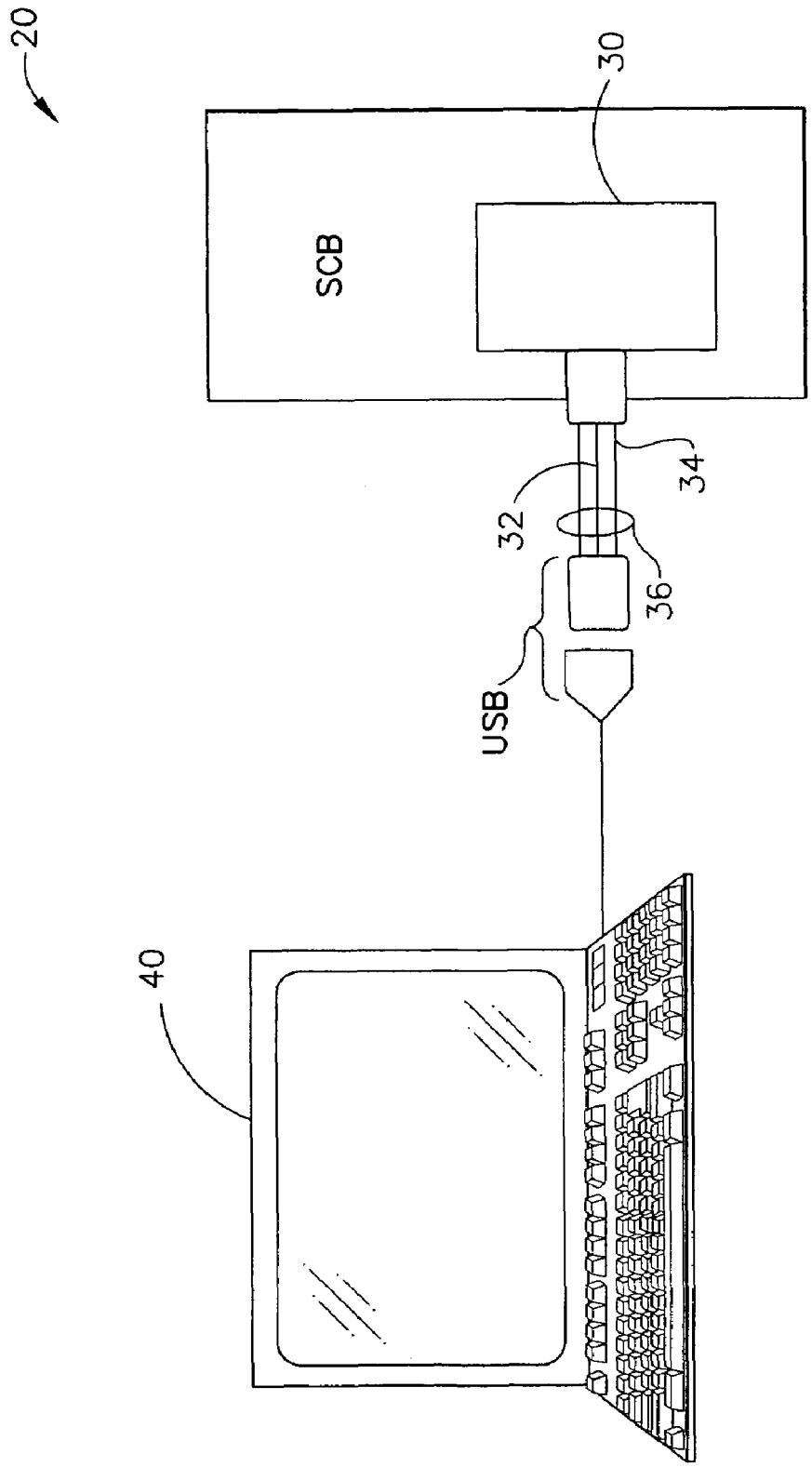
FIG. 2 is a diagram of a portable computer connected via a USB cable to the SCB.

Referring next to FIG. 2, the system 10 may also be incorporated in a portable computer 40, such as a laptop or a notebook computer. A USB cable 36 connects the computer 40 to the data/communication module 30 via USB ports (not shown).

Figure 3:
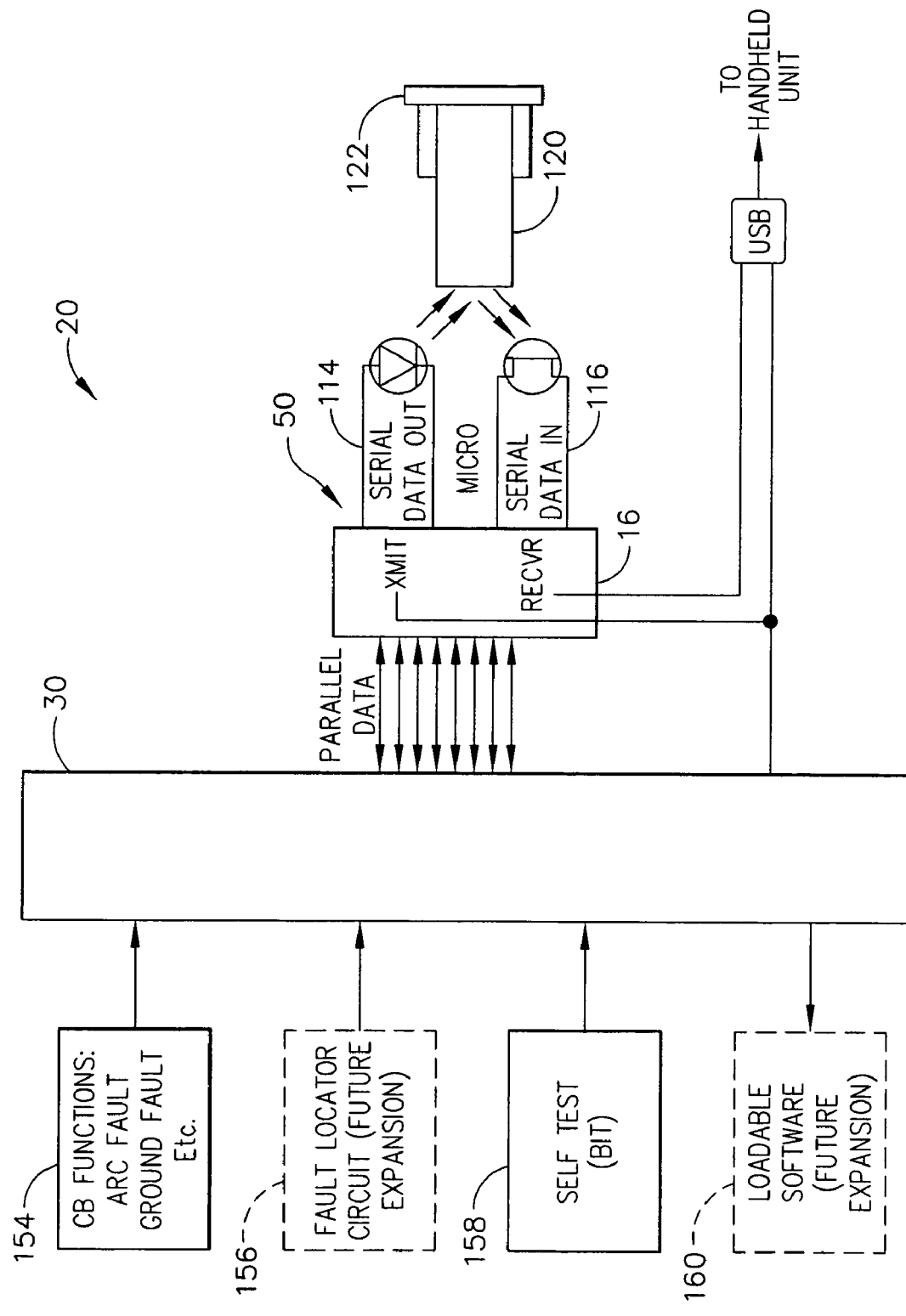
FIG. 3 is a block diagram of the circuit breaker communication system.

Various data functions are in communication with the electronic data/communications module 30 (see generally, FIG. 3). The functions may be provided as part of the SCB 20. This may include, for example, a fault type detection function 154 which may be configured to determine what caused a circuit breaker 20 to be tripped. A fault location feature 156 may also be provided to determine the exact device/location on the circuit that caused the SCB 20 to trip. It may also be desirable to provide a built in test (BIT) feature 158 as part of the SCB 20. This feature may allow the SCB 20 to run a diagnostic test on itself to insure the SCB 20 is functioning properly. It may also be desirable to provide a feature that would allow for the uploading of software to the SCB 20 as shown in block 160. This may allow the function of the SCB 20 to be upgraded as new software modules are developed.

The self-powered communications link system 10 provides power to operate the system 10 and the data/communications module 30, so that personnel, particularly maintenance personnel, can download the information contained in the data/communications module 30 when the electrical circuit breaker panel (not shown) is opened or is not powered. Generally, according to personnel safety regulations, an opened electrical panel may not be powered, so the system 10 provides power to the data/communications module 30 of the SCB 20, through the back of the circuit breaker, sufficient to download the data contained in the SCB 20.

Figure 4:
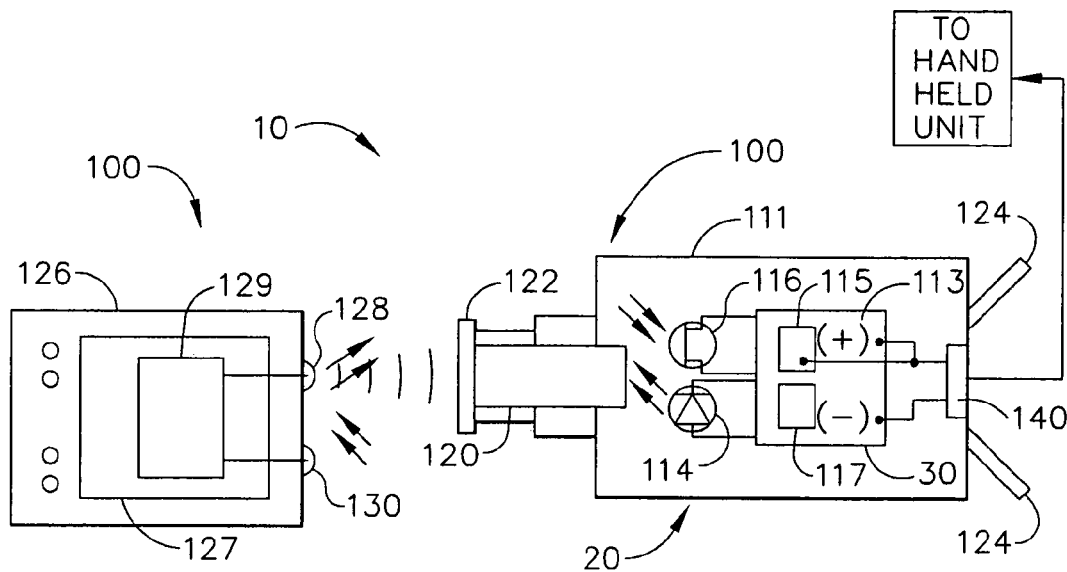
FIG. 4 is a simplified side plan view of an alternate combination circuit breaker communication system.
Figure 5:
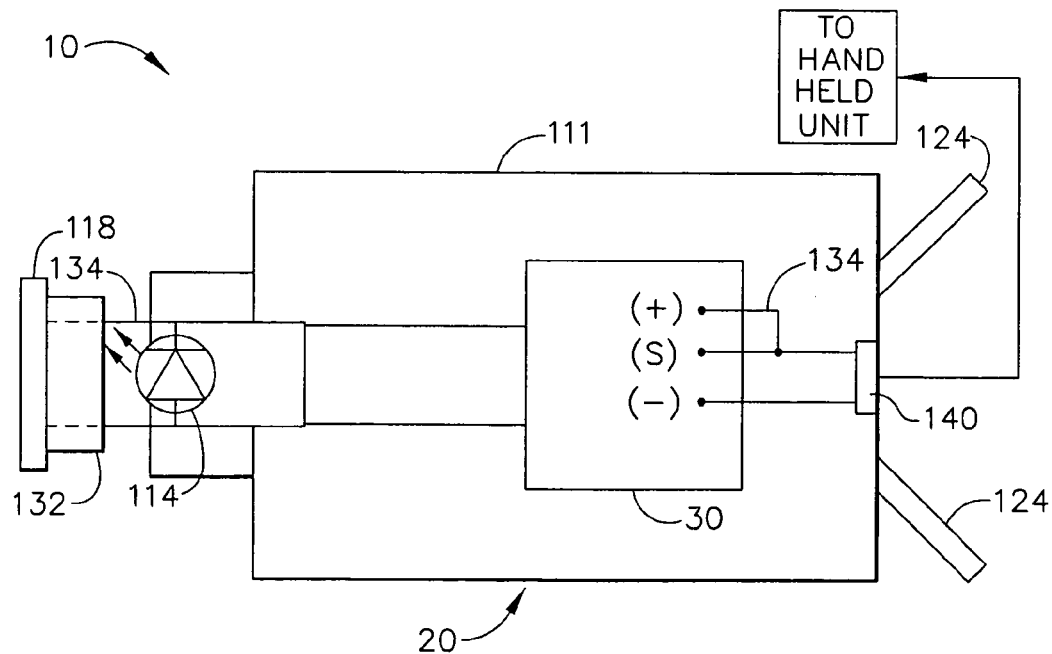
FIG. 5 is a simplified side plan view of an alternate combination circuit breaker communication system with a slide window.

In another embodiment of the invention, shown in FIGS. 4 and 5, the self-powered communications link system 10 may be combined with an optical communications link system 100, to enable downloading of information from the data/communications module 30 by multiple methods. In particular, the combination of the self-powered communications link and the optical communications link system provides the ability to interrogate the data/communications module 30 of the SCB 20 in the panel, from the front of the panel if the panel is powered, and from the back of the opened panel if the panel is not powered. In this alternate embodiment the self-powered communications link system 10 is combined with an optical data link system 100, such as is described in commonly-owned U.S. patent application Ser. No. 10/973,760, which is incorporated herein by reference. The SCB 20 includes a housing 111 which contains a data/communications module 30 therein. The housing 111 may be comprised of any well known typical circuit breaker housing, which is configured to contain the various components of a typical circuit breaker. In communication with the data/communications module 30 may be a first transmitter 114 and a first receiver 116. The data/communications module 30 may be comprised of a processor 115 and memory 117. The processor 115 and memory 117 may be configured to record and store various parameters associated with the SCB 20.

First transmitter 114 may be an LED or other optical signaling device and the first receiver 116 may be a photoreceptor of any well-known configuration. A button 118 may be movably affixed to the housing 111 and may be configured to move in relation to the opening and closing of the electrical circuit of the SCB 20. The button 118 may provide a visual indication of the status of the SCB 20 and may allow the SCB 20 to be reset to the closed position. A pair of contacts 124 may extend from the housing 111 and may be configured to attach the SCB 20 in a circuit breaker panel in any suitable manner.

A transparent window 122 may be disposed on the button 118 such that a communicator 126 can transmit to and receive data from the SCB 20. The transparent window 122 may be in the form of a lens to enhance signal isolation between the SCB 20 and the hand held device 126. The communicator 126 may be a self-powered hand held unit 12, a hand held computing device such as a Personal Digital Assistant equipped with specialized software or a dedicated device specifically adapted for use in the circuit breaker system 10. Also located on the communicator 126 may be a second transmitter 128 and a second receiver 130. Processor board 129 may be in communication with and control the operation of the second transmitter 128 and second receiver 130. Second transmitter 128 may be configured to transmit signals to first receiver 116 and first transmitter 114 may be configured to transmit signals to second receiver 130. A display 127 may be provided on the communicator 126 to display the data associated with the SCB 20 in question. Wave conduit 120 may include a fiber optic material and may be provided to further enhance the communication between the SCB 20 and the communicator 126.

In this alternate embodiment, data from data/communications module 30 is also accessible by connecting a cable, e.g., a USB cable, to the interface port 140 of the SCB 20, and an interface port of the hand-held unit 12 or a portable computer 40. The battery 24 is used to power the data/communications module 30 so that the stored data can be transmitted to the microprocessor 14 or other download device when the circuit breaker panel in which the SCB 20 is mounted is not powered. Thus, the combination of the optical communication link system 100 with the self-powered communication link 10 provides the ability to communicate with the SCB 20 mounted within a circuit breaker panel, regardless of whether the circuit breaker panel is powered.

Referring to FIG. 5, an alternate configuration of the circuit breaker system 100 is shown which includes an opaque sleeve 132 slidably mounted on a transparent area 134 of button 118 which allows the opaque sleeve 132 to be selectably positioned to allow communication between the SCB 20 and the communicator 126. In this configuration, the window 122 is omitted and communication between the SCB 20 and the communicator 126 occurs through the transparent area 134.

The data/communications module 30 may be configured to monitor various parameters associated with the circuit being protected. In the event the SCB 20 is tripped, the parameters associated with the circuit may be retained in memory. The data/communications module 30 may be further configured to operate the first transmitter 114 and first receiver 116 to relay the collected data to the communicator 126.

The data/communications module 30 of FIGS. 4 and 5 normally receives power from the SCB through a power supply within the power panel (not shown) to operate the first transmitter 114, first transmitter 116, processor 115, memory 117 and associated active elements. This permits the transfer of information through the front of the SCB 20 without removing power from the distribution panel. When the power source is removed from the SCB and the distribution panel, the transmitters are rendered inoperable. Such is normally the case when the panel door is opened.

The self-powered communications link 10 provides power to the data/communications module 30 and may be used both while the SCB 20 is deployed on an aircraft, and in a bench-testing location removed from the aircraft. The SCB 20 may thus be interrogated or programmed when it is removed from the airplane.

The self-powered communication system 10 provides a serial communications link to communicate with the SCB 20 through the rear of an unpowered electrical distribution panel. The battery 24 provides the power to the SCB 20 required to power the electronics of the data/communications module 30, so that it can communicate with the hand held device.

The self-powered communications link 10 may be used at any time in the life cycle of the SCB 20, for loading initial software, reprogramming on the airplane, allowing bench-testing access to the communication circuits, and for allowing communication with the SCB when the airplane is unpowered.

As shown in FIG. 5, the signal S may be modulated over the DC voltage 134 on a single conductor or pin of the interface 140. In this mode, the signal S would be superimposed over the DC power to the SCB 20. The power to the SCB 20 would be based on the voltage required by the SCB 20 to operate the data/communications module 30 and associated circuitry. Preferably, the voltage does not exceed 12VDC, although any suitable operating voltage, including AC voltage, may be used. The signal S may be, for example, a 1.0 VDC peak-to-peak signal superimposed on the DC line voltage 134. The device may include a ground clip to complete the circuit.

The interface on SCB 20 may be a jack having three electrically isolated contacts, one for ground, one for power, and one for serial communication.

In addition to the USB format, other bus structures may be employed using industry standard communication protocols such as RS-232 and UART. Custom designed protocols may also be used for the self-powered communications link.

Figure 6:
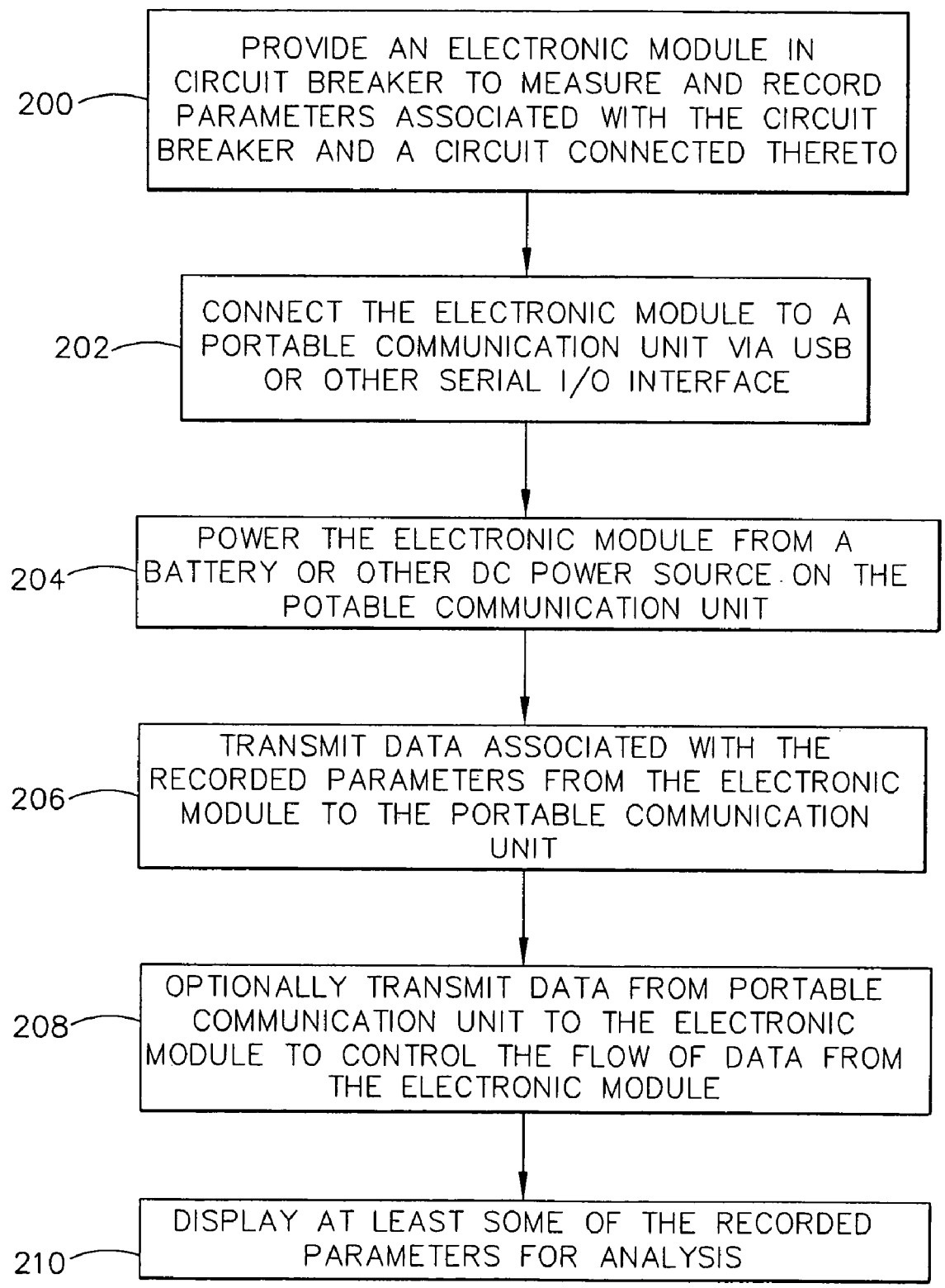
FIG. 6 is a flow chart showing the process associated with circuit breaker communication system.

Referring next to FIG. 6, a block diagram depicting the function of the circuit breaker system 10 is shown. An electronic module 30 is provided in a circuit breaker 20 at block 200. As previously discussed, the electronic module 30 is in communication with an electrical circuit. Various parameters such as voltage, current, fault type, etc. associated with the electrical circuit are recorded to memory 17 at block 200. At block 202, the electronic module 30 is connected to a portable communication unit 12. At block 204, the electronic module is powered with a power source on the portable communication unit 12. At block 206, the recorded parameters are transmitted to the portable communication unit 12. At block 208, the portable communication unit 12 may transmit data to the electronic module 30 to control the flow of data from the electronic module 30. Finally, at block 210, the record parameters are displayed on display 22 for analysis by the user.

In another aspect of the invention, the self-powered communication system 10 may have the optical window 122 located on the rear of the SCB 20 with a power cable 36 that attaches to the rear of the SCB 20. This allows a smaller connector on the rear of the circuit breaker, since no wires are required for signal or data transmission. The hand held unit 12 provides the power with a cable 36, and provides the communication via the optical link.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A circuit breaker communication system for use in an aircraft comprising:
   a circuit breaker comprising a button configured to move in response to, and provide a visual indication of, an operating status of the circuit breaker, and an optically transparent window disposed on said button;
   an electronic module associated with the circuit breaker, the electronic module configured to record and store data associated with at least one operating parameter of the circuit breaker;
   a transmitter in communication with the electronic module, the transmitter configured to transmit data associated with at least one operating parameter of the circuit breaker through the window to an optical communication link;
   a receiver in communication with the electronic module, the receiver configured to receive signals from an optical communication link;
   a portable communication unit for downloading the stored data from the electronic module, the portable communication unit including a power source, a display unit, a processor unit, a communication interface, and a keypad; and
   a cable for interconnecting the portable communication unit to the electronic module, the cable configured to carry a data signal between the portable communication unit and the electronic module, and to provide power to the electronic module from the power source;
   wherein the electronic module is operable from the portable communication unit power source when power to the circuit breaker is interrupted.

2. The circuit breaker communication system of claim 1, wherein the communication interface is a serial I/O interface.

3. The circuit breaker communication system of claim 1, wherein the portable communication unit also has an external interface configured for communication with a computer.

4. The circuit breaker communication system of claim 1, wherein the processor unit includes a memory module.

5. The circuit breaker communication system of claim 2, wherein the serial I/O interface is a USB interface, and the cable is a USB cable configured to carry data signals and power between the portable communication unit and the electronic module.

6. The circuit breaker communication system of claim 2, wherein the serial I/O interface is configured as Universal Asynchronous Receiver/Transmitter (UART).

7. The circuit breaker communication system of claim 1, wherein electronic module includes a serial interface port for coupling the electronic module to the cable.

8. The circuit breaker communication system of claim 1, wherein the power source is a battery.

9. The circuit breaker communication system of claim 1 wherein the data signal from the electronic module is modulated over the power from the power source on at least one conductor of the cable and the signal is demodulated by the processor unit.

10. The circuit breaker communication system of claim 1, wherein the circuit breaker includes a plurality of functions in communication with the electronic module, wherein the plurality of functions include fault type detection, fault location, built in test, and software uploading.

11. The circuit breaker communication system of claim 1, wherein the portable communication unit is a portable computer.

12. The circuit breaker communication system of claim 1, wherein the transmitter is an infrared LED or a visible light LED.

13. The circuit breaker communication system of claim 1, wherein the receiver is an infrared LED or a visible light LED.

14. The circuit breaker communication system of claim 1 wherein the portable communication unit is a personal digital assistant.

15. The circuit breaker communication system of claim 1 wherein the optical communication link further comprises:
   a second receiver configured to receive data from the transmitter; and
   a second transmitter configured to transmit signals to the receiver.

* * * * *